(12) United States Patent
Boland (10) Patent No.: US 9,290,157 B2
(45) Date of Patent: *Mar. 22, 2016

(54) WINDSCREEN WIPER DEVICE

(71) Applicant: Federal-Mogul, S.A., Aubange (BE)

(72) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,475

(22) Filed: Jun. 4, 2013

(65) Prior Publication Data

US 2013/0333186 A1    Dec. 19, 2013

Related U.S. Application Data

(60) Continuation of application No. 13/160,920, filed on Jun. 15, 2011, now Pat. No. 8,505,152, which is a division of application No. 11/573,065, filed as application No. PCT/EP2005/053456 on Jul. 18, 2005, now Pat. No. 7,979,950.

(30) Foreign Application Priority Data

Aug. 3, 2004   (EP) .................................... 04103735

(51) Int. Cl.
*B23P 11/02* (2006.01)
*B60S 1/40* (2006.01)
(Continued)

(52) U.S. Cl.
CPC .... *B60S 1/40* (2013.01); *B60S 1/42* (2013.01); *G06F 7/22* (2013.01); *B60S 1/4038* (2013.01); *B60S 2001/4054* (2013.01); *Y10T 29/49826* (2015.01); *Y10T 403/606* (2015.01)

(58) Field of Classification Search
CPC ...... B60S 1/40; B60S 1/42; B60S 2001/4054; B60S 1/4038

USPC .......... 29/453, 428, 525.01; 15/250.32, 250.3
See application file for complete search history.

(56) References Cited

U.S. PATENT DOCUMENTS 2,950,134 A    8/1960   Strange
2,982,586 A *  5/1961   Gliebe ...................... 403/109.3
(Continued)

FOREIGN PATENT DOCUMENTS

DE    101 30 903     5/2002
EP    1 403 156      3/2004
(Continued)

*Primary Examiner* — David Bryant
*Assistant Examiner* — Ruth G Hidalgo-Hernande
(74) *Attorney, Agent, or Firm* — Robert L. Stearns; Dickinson Wright, PLLC (57) ABSTRACT

A windscreen wiper device comprising an elastic, elongated carrier element, as well as an elongated wiper blade of a flexible material, which can be placed in abutment with a windscreen to be wiped, which wiper blade includes opposing longitudinal groove on its longitudinal sides, in which grooves spaced-apart longitudinal strips of the carrier element are disposed, wherein neighboring ends of said longitudinal strips are interconnected by a respective connection piece, which windscreen wiper device comprises a connecting device for an oscillating arm, wherein said oscillating arm is pivotally connected to said connecting device about a pivot axis near one end, with the interposition of a joint part, wherein said joint part comprises at least one resilient tongue engaging in a correspondingly shaped hole provided in said oscillating arm, and wherein said resilient tongue is rotatable along an hinge axis between an outward position retaining the wiper blade onto the oscillating arm and an inward position releasing the wiper blade form the oscillating arm, characterized in that said resilient tongue is forced in the outward position under the influence of a moment in case a force is exerted on the wiper blade in a direction away from the oscillating arm.

5 Claims, 7 Drawing Sheets

(51) Int. Cl.
*G06F 7/22* (2006.01)
*B60S 1/42* (2006.01)

(56) References Cited

U.S. PATENT DOCUMENTS 4,308,635 A 1/1982 Malocco
4,348,782 A 9/1982 Fournier
4,598,438 A 7/1986 Egner-Walter et al.
5,531,464 A 7/1996 Maurer et al.
7,979,950 B2 * 7/2011 Boland ...................... 15/250.32

FOREIGN PATENT DOCUMENTS

| EP | 1403156 A1 * | 3/2004 |
| FR | 2 781 741 | 2/2000 |
| FR | 2 804 923 | 8/2001 |

* cited by examiner

WINDSCREEN WIPER DEVICE

RELATED APPLICATIONS

This is a Continuation application which claims priority to U.S. Divisional application Ser. No. 13/160,920, filed Jun. 15, 2011, which claims priority to U.S. Utility application Ser. No. 11/573,065, filed Feb. 1, 2007, and is incorporated herein by reference.

BACKGROUND OF THE INVENTION

1. Technical Field

The present invention relates to a windscreen wiper device.

2. Related Art

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating arm, wherein said oscillating arm is pivotally connected to said connecting device about a pivot axis near one end, with the interposition of a joint part, wherein said joint part comprises at least one resilient tongue engaging in a correspondingly shaped hole provided in said oscillating arm, and wherein said resilient tongue is rotatable along an hinge axis between an outward position retaining the wiper blade onto the oscillating arm and an inward position releasing the wiper blade from the oscillating arm.

Such a windscreen wiper device is known from European patent publication no. 1 403 156 of the same Applicant. This prior art windscreen wiper device is designed as a "yokeless" wiper device, wherein no use is made of several yokes pivotally connected to each other, but wherein the wiper blade is biassed by the carrier element, as a result of which it exhibits a specific curvature. In order to connect the wiper blade onto the oscillating arm, said resilient tongue is initially pushed in against a spring force—as if it were a push button—and then allowed to spring back into the hole provided in said oscillating arm, thus snapping, that is clipping the resilient tongue into the hole. By subsequently pushing in again said resilient tongue against the spring force, the wiper blade may be released from the oscillating arm.

In practice it has become apparent that, during use of the windscreen wiper device known from the above European patent publication, high forces are exerted on the connection between the connecting device and the oscillating arm. As a consequence thereof the resilient tongue may no longer be in a proper snapped position into the hole of the oscillating arm, resulting in play between the connecting device and the oscillating arm. Eventually, the wiper blade may get loose from the oscillating arm.

SUMMARY OF THE INVENTION

The object of the invention is to provide a windscreen wiper device, wherein the connecting device and the oscillating arm are interconnected in an improved manner.

In order to accomplish that objective, a windscreen wiper device of the type referred to in the introduction is characterized according to the invention in that said resilient tongue is forced in the outward position under the influence of a moment in case a force is exerted on the wiper blade in a direction away from the oscillating arm. Particularly, the counterforce exerted by the oscillating arm on the resilient tongue engages at a point located behind the hinge axis, seen in the direction of the force exerted on the wiper blade. In other words, said moment of force ensures in a natural way that the resilient tongue is forced automatically in its outward position, that is its position retaining the wiper blade onto the oscillating arm. On the contrary, in the above-mentioned European patent publication no. 1 403 156 of the same Applicant said moment during use compels the resilient tongue to automatically take its inward position, thereby releasing the wiper blade from the oscillating arm, with all negative consequences involved.

In one preferred embodiment of a windscreen wiper device in accordance with the invention the hinge axis is located near an outer edge of said joint part.

In another preferred embodiment of a windscreen wiper device according to the invention the oscillating arm has an at least substantially U-shaped cross-section at the location of its connection to said joint part, wherein said hole is provided in a base of said U-shaped cross-section. In addition thereto or in the alternative said joint part comprises at least two lateral resilient tongues extending outwardly, wherein the oscillating arm has an at least substantially U-shaped cross-section at the location of its connection to said joint part, and wherein each tongue engages in a correspondingly shaped hole provided in a leg of said U-shaped cross-section.

In another preferred embodiment of a windscreen wiper device in accordance with the invention said hole(s) has/have a closed circumference. Such (a) closed hole(s) enhance(s) the retention of the connection device/joint part onto the oscillating arm in all possible directions, particularly both horizontally and vertically. In the alternative, said hole(s) has/have a non-closed circumference. In another preferred embodiment of a windscreen wiper device according to the invention said joint part is made of plastic (including any synthetic material having some flexibility).

In another preferred embodiment of a windscreen wiper device in accordance with the invention said joint part is attached to said connecting device by pivotally engaging protrusions of said connecting device, at the location of said pivot axis, in recesses provided in said joint part. These protrusions that function as bearing surfaces are spaced far apart, so that the forces exerted thereon will be relatively low.

In another preferred embodiment of a windscreen wiper device according to the invention said joint part has an at least substantially U-shaped cross-section at the location of its attachment to said connecting device, and wherein said joint part in each leg of said U-shaped cross-section is provided with a recess provided coaxially with said pivot axis. Preferably, the protrusions extend outwards on either side of said connecting device, wherein the protrusions are cylindrical. Particularly, the recesses are correspondingly shaped.

BRIEF DESCRIPTION OF THE DRAWINGS

These and other features and advantages of this invention will become more apparent to those skilled in the art from the detailed description of a preferred embodiment. The drawings that accompany the detailed description are described below.

DETAILED DESCRIPTION OF THE PREFERRED EMBODIMENTS

Figure 1:
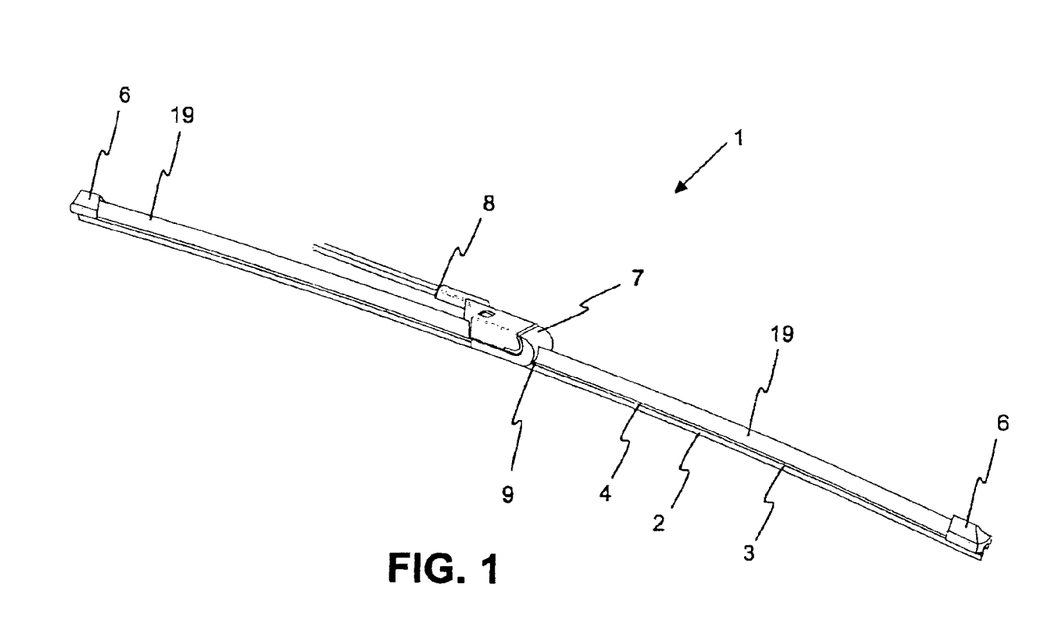
FIG. 1 is a perspective, schematic view of a preferred embodiment of a windscreen wiper device in accordance with the invention.

FIG. 1 shows a preferred variant of a windscreen wiper device 1 according to the invention. Said windscreen wiper device 1 is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element for the wiper blade 2, as it were, which is thus biassed in a curved position (the curvature in operative position being that of a windscreen to be wiped). Neighbouring ends 5 of the strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having a positive fit") or force-locked to the ends 5 of the strips 4. In another preferred embodiment, said connecting pieces 6 are in one piece with the strips 4 made of spring band steel. In the latter case said connecting pieces 6 form transverse bridges for the strips 4, as it were.

The windscreen wiper device 1 is furthermore built up of a connecting device 7 of plastic material for an oscillating arm 8. Alternatively, the connecting device 7 may also be made of metal, such as steel or aluminum. The connecting device 7 comprises clamping members 9 that are integral therewith, which engage round longitudinal sides of the strips 4 that face away from each other, as a result of which the connecting device 7 is firmly attached to the unit consisting of the wiper blade 2 and the strips 4. The oscillating arm 8 is pivotally connected to the connecting device 7 about a pivot axis near one end, as will be described hereunder.

Figure 2:
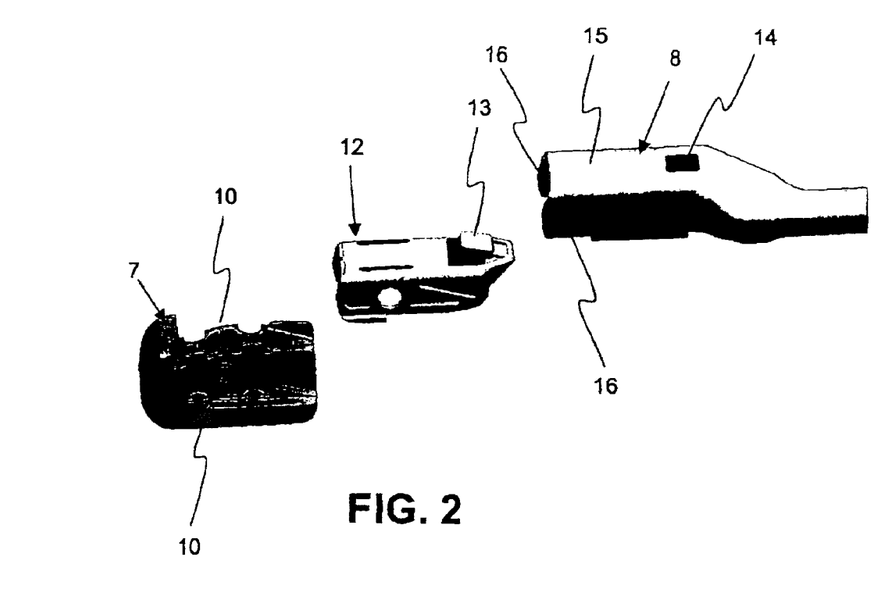
FIG. 2 is an exploded perspective, schematic view of a connecting device as used in FIG. 1, as well as a joint part and a portion of an oscillating arm according to another preferred embodiment in accordance with the invention.

With reference to FIG. 2 the connecting device 7 comprises two cylindrical protrusions 10 extending outwards on either side of said connecting device 7. These protrusions 10 pivotally engage in identically shaped cylindrical recesses 11 of a plastic joint part 12. In the alternative the recesses 11 may have a non-closed shape (i.e. open circumference). Said protrusions 10 act as bearing surfaces at the location of a pivot axis in order to pivot the joint part 12 (and the oscillating arm 8 attached thereto) about said pivot axis near one end of the oscillating arm 8. The protrusions 10 are preferably in one piece with the connecting device 7; in the alternative, the protrusions 10 are part of a single pivot pin perpendicular to the connecting device 7. Said connecting device 7 may be equipped with a cover or cap in order to obtain an aesthetic appearance thereof, to avoid sharp edges and to provide protection against UV-light etcetera. The joint part 12 comprises one resilient tongue 13 extending outwardly, while the oscillating arm 8 has an U-shaped cross-section at the location of its connection to said joint part 12, so that the tongue 13 engages in an identically shaped hole 14 provided in a base 15 of said U-shaped cross-section.

Figure 3A:
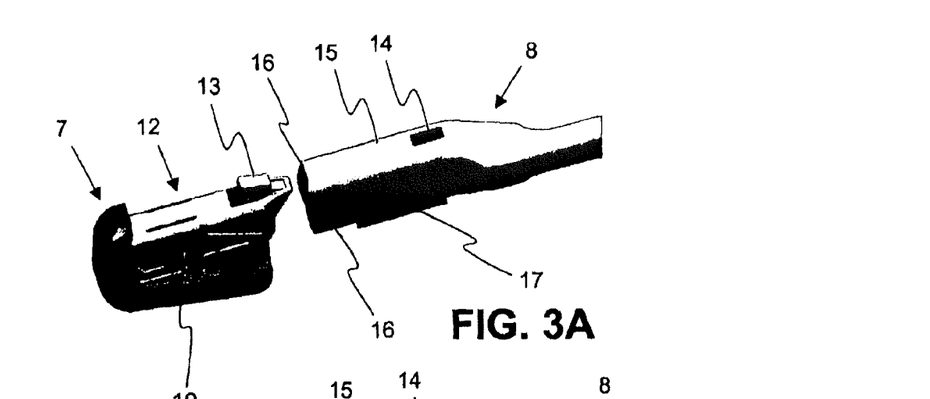
FIGS. 3A, 3B, and 3C shows successive steps for fitting the connecting device, the joint part and the oscillating arm of FIG. 2 together.
Figure 3B:
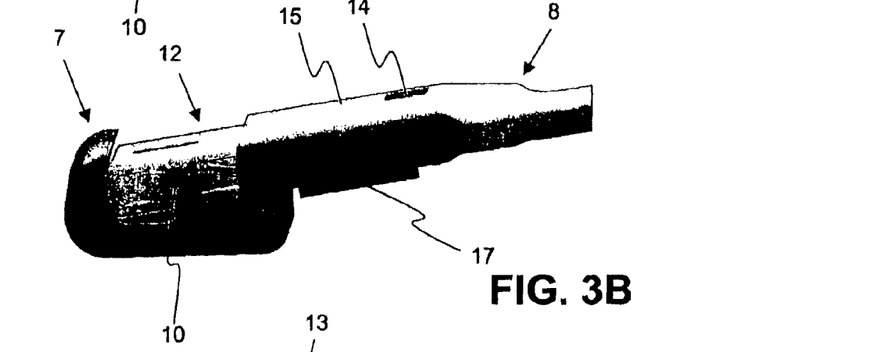
Figure 3C:
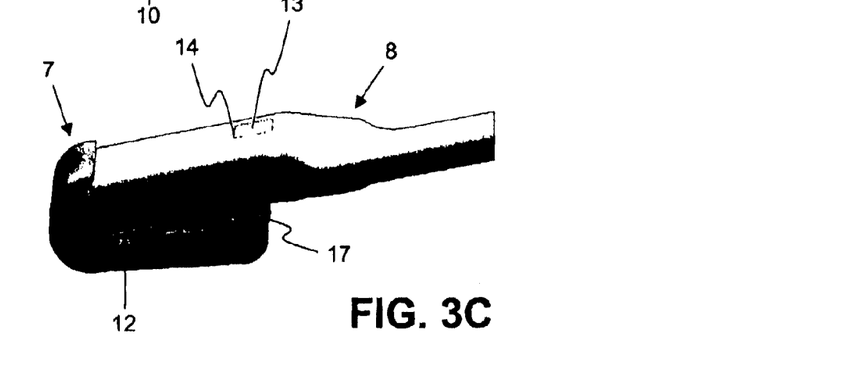

FIG. 3 shows the steps of mounting the connecting device 7 with the wiper blade 2 (not shown) onto the oscillating arm 8. The joint part 12 being already clipped onto the connecting device 7 is pivoted relative to the connecting device 7, so that said joint part 12 can be easily slid on a free end of the oscillating arm 8. During this sliding movement the resilient tongue 13 is initially pushed in against a spring force and then allowed to spring back into said hole 14, thus snapping, that is clipping the resilient tongue 13 into the hole 14. This is a so-called bayonet-connection. The oscillating arm 8 together with the joint part 12 may then be pivoted back in a position parallel to the wiper blade 2 in order to be ready for use. By subsequently pushing in again said resilient tongue 13 against the spring force (as if it were a push button), the connecting device 7 and the joint part 2 together with the wiper blade 2 (not shown) may be released from the oscillating arm 8. Dismounting the connecting device 7 with the wiper blade 2 (not shown) from the oscillating arm 8 is thus realized by sliding the connecting device 7 and the joint part 2 together with the wiper blade 2 (not shown) in a direction away from the oscillating arm 8.

Each leg 16 of the U-shaped cross-section of the oscillating arm 8 comprises clamping members formed as inwardly bended edges 17 integral with said legs 16, wherein during use said edges 17 engage round longitudinal sides of said joint part 12 that face away from each other. Thus an enhanced retention of the connecting device 7/joint part 12 onto the oscillating arm 8 is achieved in vertical direction, that is perpendicular to the longitudinal direction of the oscillating arm 8.

Figure 4:
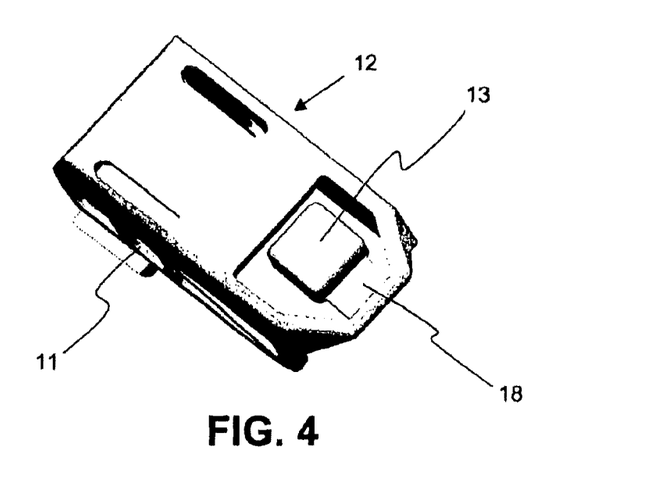
FIGS. 4 and 5 are top and side views of a joint part of FIGS. 2 and 3.
Figure 5:
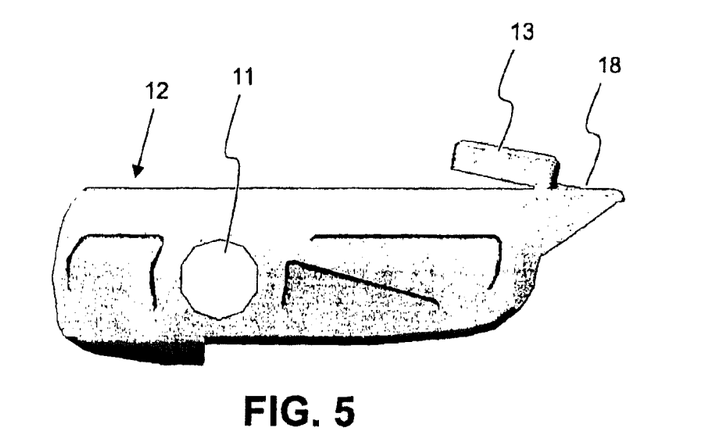

FIGS. 4 and 5 relate to several views of a joint part of FIGS. 2 and 3. Said resilient tongue 13 is rotatable along an hinge axis 18 (located near an outer edge of said joint part 12) between an outward position retaining the wiper blade 2 onto the oscillating arm 8 and an inward position releasing the wiper blade 2 from the oscillating arm 8. According to an essential feature of the invention said resilient tongue 13 is forced in the outward position under the influence of a moment in case a force is exerted on the wiper blade 2 in a direction away from the oscillating arm 8. Particularly, the counterforce exerted by the oscillating arm 8 on the resilient tongue 13 engages at a point located behind the hinge axis 18, seen in the direction of the force exerted on the wiper blade 2. In other words, said moment of force ensures in a natural way that the resilient tongue 13 is forced automatically in its outward position, that is its position retaining the connecting device 7, the joint part 12 and the wiper blade 2 (not shown) onto the oscillating arm 8.

Figures 6, 7, 8:
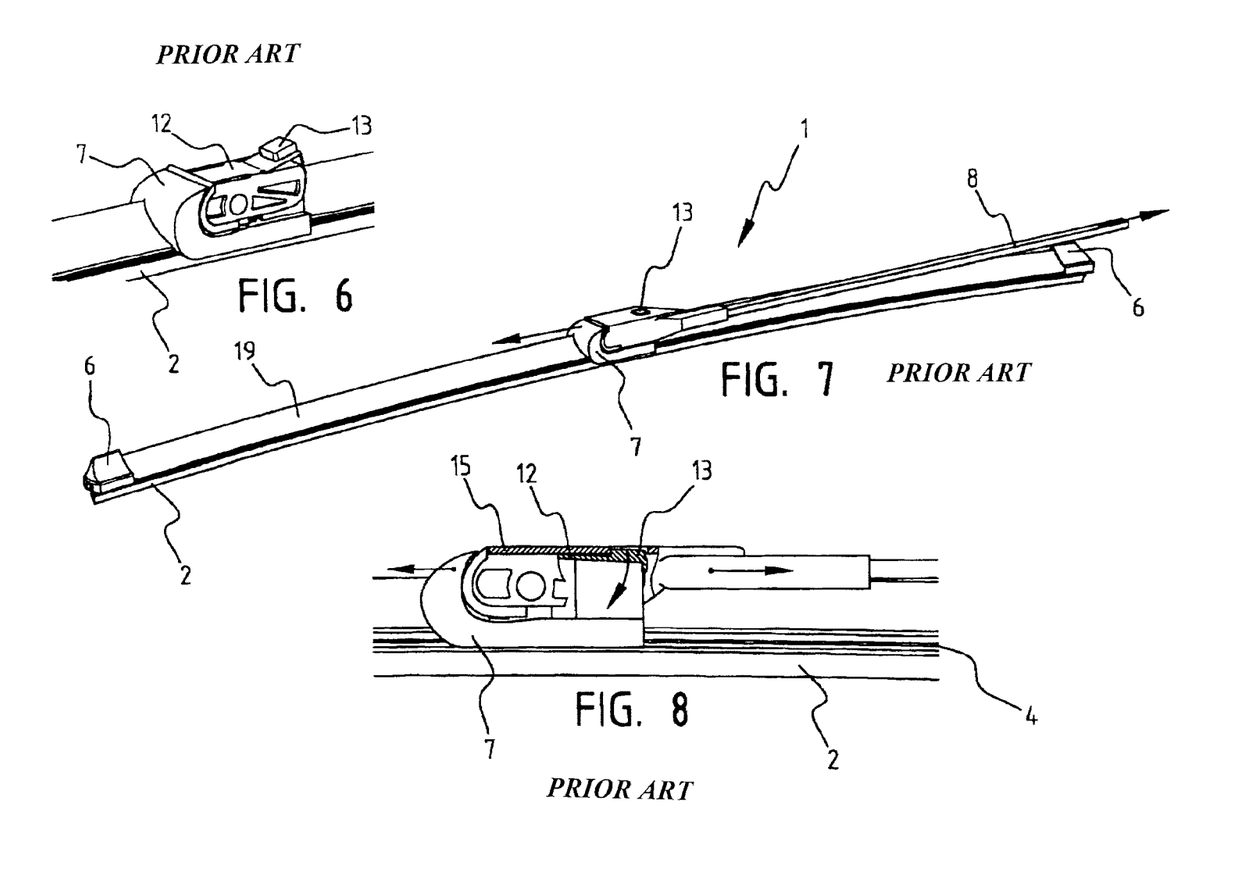
FIG. 6 is a fragmentary perspective view of a prior art wiper device.
FIG. 7 is a perspective view of the prior art device of FIG. 6.
FIG. 8 is a fragmentary side view of the prior art device of FIG. 10, shown partially in section.

In FIGS. 6, 7 and 8 a windscreen wiper device according to the prior art, for example of the type is described in European patent publication no. 1 403 156 indicated earlier, is shown, wherein corresponding parts have been designated by the same reference numbers. In case a force is exerted on the wiper blade 2 in a direction of the arrow of FIG. 7, the counter force exerted by the oscillating arm 8 may cause the resilient tongue 13 to be pushed inwardly, so that the wiper blade 2 may get loose from the oscillating arm 8 (see FIG. 8).

Figures 9, 10, 11:
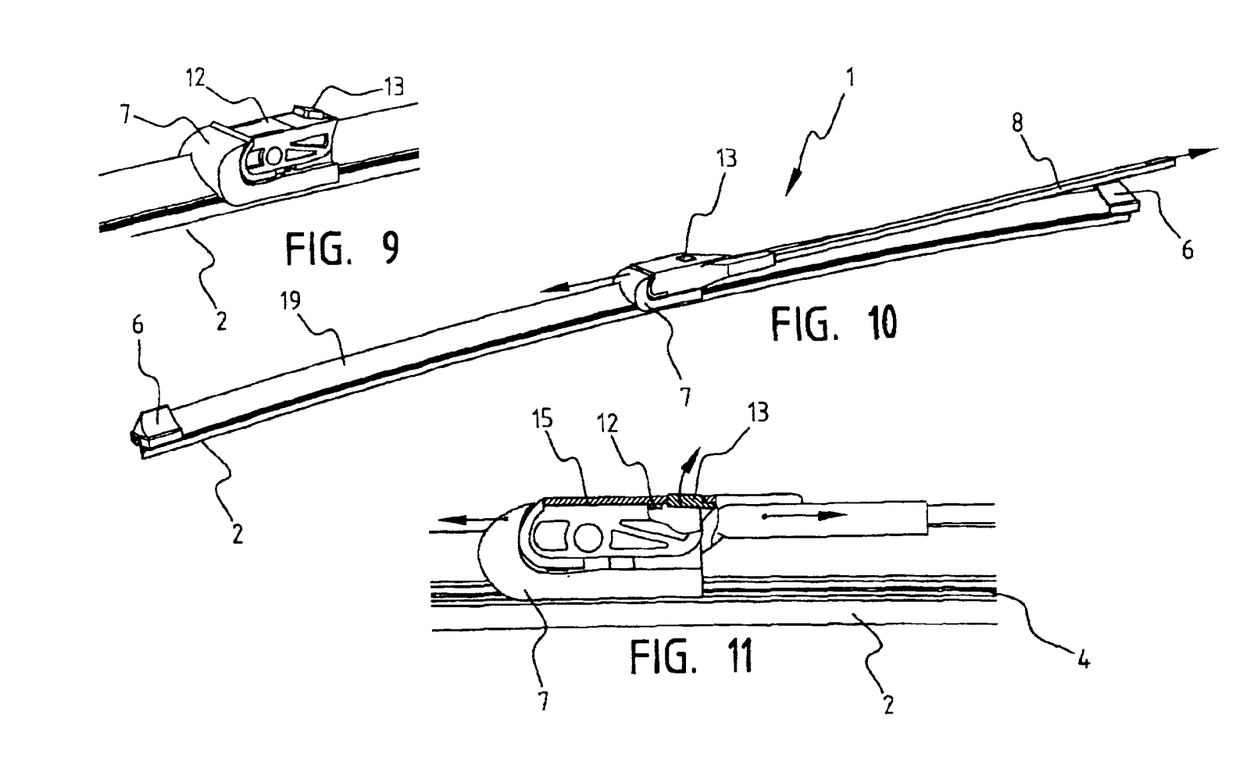
FIG. 9, is a fragmentary perspective view of an embodiment of the wiper blade.
FIG. 10 is a perspective view of the wiper blade of FIG. 9.
FIG. 11 is a fragmentary side view of the wiper blade of FIG. 10, shown partly in section.

As can be seen in FIGS. 9, 10 and 11 corresponding to FIGS. 6, 7 and 8, respectively, the counterforce exerted by the oscillating arm 8 as mentioned above automatically forces the resilient tongue 13 in the outward position, thereby retaining the wiper blade 2 on the oscillating arm 8 (FIG. 11).

Possibly, a spoiler 19 is furthermore provided (FIG. 1).

Figure 12:
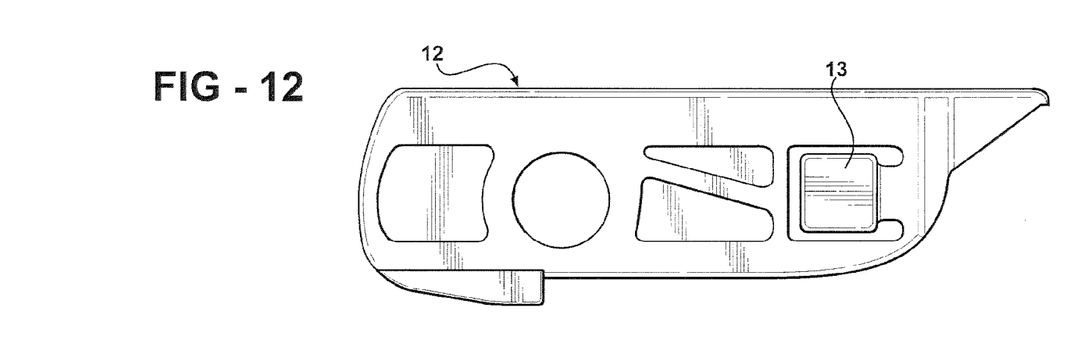
FIG. 12 is a side view of a joint part according to an alternative embodiment of the invention.
Figure 13:
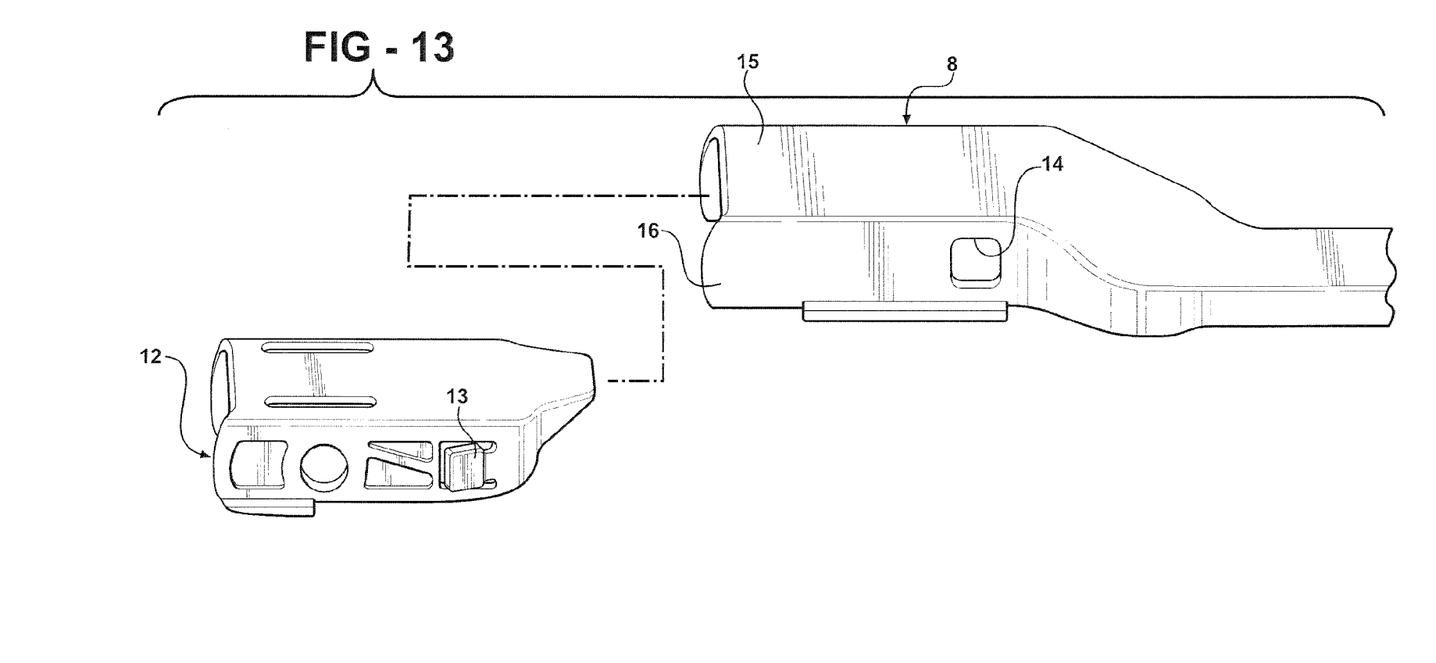
FIG. 13 is an exploded perspective view showing the joint part in FIG. 12 in position for connection with an end part of a wiper arm.

FIGS. 12 and 13 depict an alternative embodiment of the invention, wherein the joint part 12 comprises at least two lateral resilient tongues 13 extending outwardly. Each tongue 13 engages in a correspondingly shaped hole 14 provided in each leg 16 of its u-shaped cross-section.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. A method of connecting a wiper blade to a wiper arm, having at least one shaped hole provided in the wiper arm adjacent a free end thereof, said method comprising:
preparing a wiper blade having a longitudinally extending wiper element, a support structure supporting the wiper element, and a joint part pivotally connected to the support structure for relative pivotal movement about a pivot axis transverse to the longitudinal direction of the wiper element, and wherein the joint part includes at least one resilient latching tongue having an integral hinge adjacent one end of the joint part and extending therefrom to an opposite free end of the tongue which is spaced between a hinge axis and the pivot axis and being closer to the hinge axis than to the pivot axis; and sliding the joint part of the wiper blade into engagement with the wiper arm to cause the tongue to first deflect inwardly and then to spring outwardly as a projection adjacent the free end of the tongue comes into registry with and is received in the shaped hole of the wiper arm, and upon exerting a reverse longitudinal separation force on the wiper arm and joint part, causing the tongue whose projection is received in the at least one shaped hole to be urged further outwardly, such that the tongue actively resists disconnection from the wiper arm in response to such separation force tending to pull the wiper blade away from the wiper arm.

2. The method of claim 1 wherein the wiper arm to which the wiper blade is attached is selected to have at its free end a generally u-shaped configuration with a top wall and two side walls and with the at least one shaped opening being provided in at least one of the walls.

3. The method of claim 2 wherein the shaped opening is selected to be in the top wall.

4. The method of claim 2 wherein upon connecting the joint part with the wiper are, orienting the joint part such that the hinge of the tongue is pointed in the direction of sliding such that the free end of the tongue is extended away from the direction of sliding during the connection.

5. The method of claim 2, wherein the shaped hole of the wiper arm is positioned, when the wiper blade is connected, between the hinge of the at least one tongue and the pivot axis of the joint part.

* * * * *